June 20, 1967
H. H. LOVETTE ET AL
3,325,834
INNER SPRING BODY SUPPORTING ARTICLE AND
METHOD OF MAKING THE SAME
Filed Dec. 28, 1965
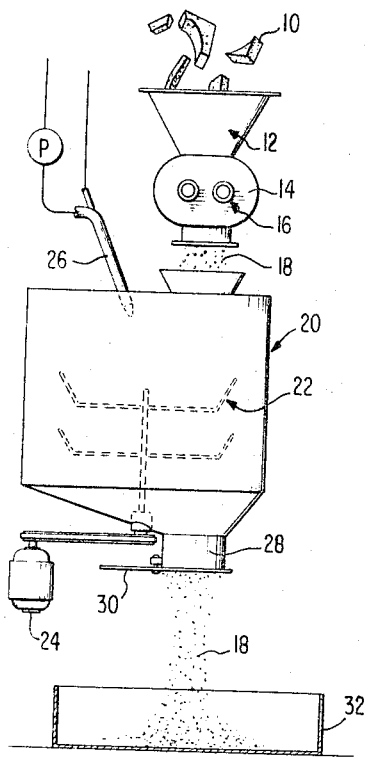
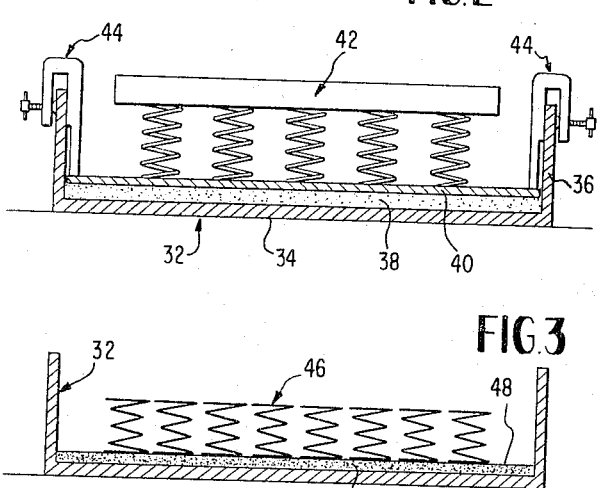
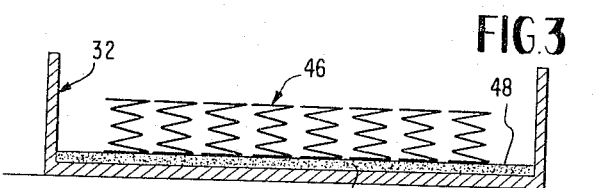
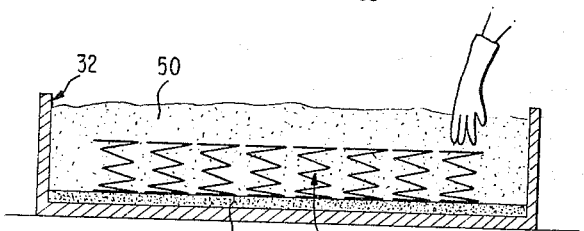
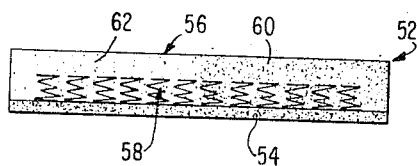
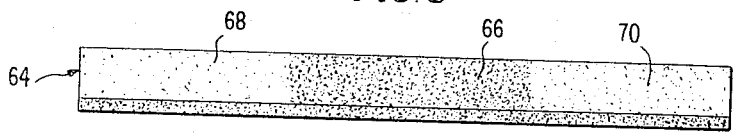
INVENTORS
HENRY H. LOVETTE
EARL W. HILL
BY *Jiminie and Smiley*
ATTORNEYS

United States Patent Office 3,325,834
Patented June 20, 1967

3,325,834
INNER SPRING BODY SUPPORTING ARTICLE AND METHOD OF MAKING THE SAME
Henry H. Lovette, 2431 English Road 27260, and Earl W. Hill, Rte. 3, Box 197B 27263, both of High Point, N.C.
Filed Dec. 28, 1965, Ser. No. 516,988
2 Claims. (Cl. 5—361)

This invention generally appertains to improvements in the construction of body supporting articles in the nature of seating, reclining or sleeping equipment and, more particularly, relates to new and novel improvements in the construction of inner spring seats, cushions, mattresses and the like articles and to a novel method of producing the same.

It is an established commercial manufacturing practice to form seats, cushions, mattresses and the like articles for seating, reclining or sleeping purposes from multicellular spongy material, which is poured in a liquid state around a spring unit and then cured so that the resultant molded body encases and conceals the spring construction. Such articles have decided advantages over foam rubber or plastic articles, without an inner spring construction, in as much as they are more yieldable and comfortable and tend to maintain their shape for a longer period of time.

However, such foam rubber or plastic articles, which are molded around a spring construction, have decided disadvantages, from a standpoint of long lasting comfortable use, appearance and utility and also from a standpoint of production costs and time.

In the first instance, such inner spring articles, after a long period of use, tend to lose their resiliency and the edges thereof do not retain their shape but instead tend to sag, whereby firm and even, overall support is not provided. Furthermore, the springs of the spring unit have a decided tendency to squeak which is irritating, particularly when the article is in the form of a mattress.

In the second instance, the formation of the articles from virgin liquid foam, such as polyurethane, is expensive because of the cost of the material and the manner in which the article must be formed from the material, since the liquid must be poured into a mold having a spring unit disposed therein and then the mold must be subjected to a series of operations in order to achieve the final curing of the article and the resultant useful article. Therefore, from a viewpoint of materials and man-hours, together with equipment, the cost of production is very high.

Having in mind the foregoing generally outstanding, though not complete, disadvantages of known foam rubber or plastic inner spring articles, it is an important object of the present invention to overcome such disadvantages by providing an inner spring body supporting article which is of a novel and considerably inexpensive, yet more comfortable and durable, construction and which is formed in a new, novel and most inexpensive manner.

In the trade, after foam articles, with or without an inner spring construction, are formed, it is usual to shape such articles on cutting tables and to treat the edges by cutting operation, which results in the creation of scraps of preset and preformed cellular or spongy materials. In line with the above-stated objectives of creating a less expensive article and of reducing considerably the cost of production of an inner spring body supporting article and forming a better one, it is a purpose of the present invention to utilize the scraps as a basic material. However, it is to be understood that the basic material, while it is preferred to be of multicellular spongy material, does not necessarily have to be scraps from the cutting table but can be such material formed particularly for the purposes of the present invention. Also, it can be other types of known resilient padding or bedding material.

Another important object of the present invention is to provide an inner spring body supporting article which is formed so that the spring unit will not squeak and so that the edges of the article will not have any tendency to sag and the article will have a better resiliency so that it will provide a long lasting firm overall support.

A further important object of the present invention is to provide such an article which, while of a unitary overall construction, can be formed with depth-wise portions thereof, from a length of widthwise direction, that are of relatively greater or lesser density, so that portions thereof can be firmer or softer than other portions, which is of particular importance in the bedding field.

Another object of the present invention is to provide a body supporting article, which is formed from multicellular, resilient spongy material, that is so related with the spring unit that the article possesses greater inherent resiliency, prevents the springs of the spring unit from squeaking, supports the springs and, enables the springs to remain firm, with the spring unit, in turn, preventing the material from taking a set.

A further important object of the present invention is to provide a novel method of forming the articles from particles of preformed multicellular resilient or spongy material which method is very inexpensive and permits the articles to be formed in a more inexpensive and expeditious manner.

A further object of the present invention is to provide a novel method whereby such particles can be affixed to and through the spring unit in a manner to adhere to the individual springs of the unit, thereby giving better resiliency to the article, preventing squeaking of the springs, and forming the article so that it remains firm and is prevented from taking a set.

A further object is to provide a novel method whereby the article can be formed with portions thereof that are of differing density, so that the portions provide different types of supports, that is, either relatively firmer or softer.

A further important object of the present invention is to provide a sturdy, inexpensive and long lasting inner spring foam rubber or plastic body supporting article and to provide an inexpensive and less time consuming and more efficient method of forming such an article.

The foregoing and ancillary objects are attained by the present invention, the preferred embodiment of which is set forth in the following description and illustrated in the accompanying drawing, wherein:

FIGURE 1 is a side elevational view, somewhat diagrammatic, of one form of mechanical means used in connection with the practicing of certain of the steps of the novel method of the present invention;

FIGURE 2 is a cross-sectional view of a mold and associated equipment, showing the initial step of that portion of the method, after the particles have been deposited into the mold;

FIGURE 3 is a view similar to FIGURE 2, showing the subsequent step in the method;

FIGURE 4 is a view similar to FIGURE 3, showing further subsequent step in the method;

FIGURE 5 is a vertical, cross-sectional view of a mattress, which is formed in accordance with the present invention and illustrating the difference in density between two side by side sections thereof, and FIGURE 6 is a longitudinal, vertical sectional view of a mattress (with the spring unit not shown for purposes of clarity) illustrating how a transverse portion thereof can be of differing density from the top and bottom end portions.

Before specifically referring to the drawing, a general outline of the process of the present invention and general description of the resultant body supporting article, whether it be a chain cushion, vehicle seat, mattress or anything of that nature, will be given.

In the first place, the briefly mentioned disadvantages for forming an inner spring rubber or plastic foam article from virgin foam liquid, such as polyurethane, have been outlined and it can be recognized that the most serious disadvantages are from a production cost and from a standpoint of comfort in use and longevity in wear.

The present invention utilizes scraps of bonded foam material, such as polyurethane or the like, obtained from the cutting table or similar spongy material, which is in the form of relatively large chunks. The first step of the method involves the cutting or comminuting of the chunks into small particles of a size generally about $1/16$ of an inch, the shape thereof being immaterial and usually being irregular. The particles are mixed with an adhesive, which is sprayed onto the particles in a foam or mist-like form so that the entire peripheral surfaces of the particles are covered, and the particles are blended with the adhesive, which is of such a nature that the particles do not tend to adhere together in the blending operation.

The particles are then deposited in a free gravitational flow into a mold, the shape of which is dependent upon the desired outline shape of the article and the nature and use thereof. A bottom or bed layer is formed first by compressing the initially deposited particles to the desired density and thickness. The adhesive is of such a nature that it will tend to set within about ten to twenty minutes and, after the expiration of such a period of time, a spring unit, which may be in the form of basic coil spring construction is freely superimposed on the bed layer.

Then, an additional quantity of particles, under free gravitational flow, is deposited onto the bed layer in the mold covering over the spring unit. Either by hand or with mechanical means, the additional quantity of particles is worked into, through and around the coils of the spring unit and around the borders of the spring unit. Then the final buildup is realized, whereupon the particles are compressed to bind them together into a supporting layer which becomes adhered to the bed layer. The mold is then put into a curing chamber so that the article is cured or curing may take place in any known artificial or natural manner.

During the step of working the second depositing of the particles into the mold box, desired portions of the article can be built up to higher depth and compressed to a greater density so that it is possible to build up the particles in one portion or place and lessen the particles in another portion or place, giving higher and lesser densities to such portions or places, with the result that the portions or places will be firmer or softer. This is of particular significance in the formation of a mattress, where it is desired to make one side harder than the other or to make the center section harder and give more firm support than the head and foot sections of the mattress.

Referring now more particularly to the accompanying drawing, and initially to FIGURE 1, large pieces of chunks 10 of a pliable, resilient, spongy nature (being formed preferrably from a preset and preformed multicellular rubber or plastic material) are deposited in any size into a cutter 12. The cutter 12 is in the form of a receiving hopper and a cutting chamber 14, wherein cooperating cutting means 16 (not shown in detail) are operatively disposed so as to comminute the chunks into tiny particles 18. The particles 18 are generally of a size of approximately $1/16$ of an inch but the exact size of the particles is not of any criticality, it only being important that the particles are rather small. Obviously, the particles will be of irregular shape.

The particles 18 are discharged, under gravitational flow, from the outlet of the chamber 14 into a blender 20, wherein blending means 22 is operatively mounted and is driven by a motor 24, for example.

The particles 18 are blended with an adhesive that is sprayed into the blender 20 through a pipe 26. The adhesive is emitted under pressure from the discharge mouth of the pipe in the form of a fine mist or fog.

Various adhesives may be used. An adhesive formed from commercially known and available Polyall 3001 (organic isocyanates) and commercially known and available TDI (toluene=2, =4 diisocyanate) has been found to be extremely effective, practical and inexpensive. The preferred portions are Polyall 3001 per 100 lbs. and TDI per 32.5 lbs. mixed together for approximately 45 minutes. The liquid adhesive is then sprayed, under pressure, onto the particles in the blender, in a proportion of approximately one pound of such adhesive per 14 pounds of particles.

The adhesive is of such a nature that the coated particles will not stick together to form globs in the blender but will maintain their separate relationship.

The blender 20 is formed with a gravity discharge 28, controlled by a controll or shut off means 30 and the particles, with the adhesive in intimate contact or association with their entire peripheral surfaces, are discharged from the discharge 28 in a free gravitational flow into a mold box 32. The adhesive covered particles gravitate into the mold box simulative of the falling of snow.

After a sufficient amount of particles have been deposited in the mold box, which comprises a flat base 34 and upstanding sides 36, the next step is to treat the initially deposited particles so as to form the bed layer 38 of the article.

While the sides 36 of the mold box are shown as being straight it is obvious that the sides can be curved and that the overall plan form or outline of the mold box will be dependent upon the desired plan form or outline of the article being made. But, it is preferred that the sides be of a height to extend a few inches above the desired thickness of the article to be formed.

The bed layer 38 of the article is formed from the initially deposited particles in a manner, such as shown in FIGURE 2.

As shown in FIGURE 2, a flat lid 40 is superimposed on the bed layer 38 and is tightly pressed against the bed layer by a mechanically or otherwise controlled spring pressure means 42, whereby the lid exerts an even and constant pressure on the bed. Once the pressure has been established, clamps 44 are utilized to hold the lid in place, until the bed layer is set. Because of the nature of the adhesive, the setting up time is generally about 10 to 20 minutes.

After the bed layer 38 has been set, the lid clamps 44 are removed to permit removal of the lid 40. Then, spring unit 46, which may be a conventional or standard coil spring unit, as shown, is superimposed on the upper surface 48 of the bed layer, care being taken to insure that the spring unit is so disposed as to leave side and end portions of the bed layer exposed to form the border of the resultant article. It is to be noted that the upper surface 48 is even and flat, providing a firm and even support for the spring unit 46.

The mold box is then filled with a further deposit of particles and the particles infiltrate the coils of the spring unit 46, as they gravitate down over the spring unit and onto the bedy layer 38. The particles which have filtered down into and around and over the spring unit are worked by hand, as shown in FIGURE 4, or may be worked by any mechanical means to ensure that the particles are disposed within and between each coil of the separate spring coils and that the particles are packed in tight around the springs.

Because of the adhesive surfaces of the particles, the particles will adhere to the springs, which will keep the springs from squeaking when the final article is used. The particles act as an insulation, in this regard. The springs are completely filled which helps the springs to remain firm and the springs aid the particles in remaining firm and preventing them from taking a set in the final formation of the article. In this respect, the particles, having been formed from solid material chunks 10, have less set because they have already been compressed.

After the second or body supporting layer 50 has been built up and around and through the spring unit 46, as shown in FIGURE 4, the lid 40 is then placed on top thereof and subjected to compression and the clamps utilized, whereby the second or body supporting layer 50 is given a set and the upper surface thereof is formed flat and smooth. The lid is then removed and the mold is placed in an oven at a curing temperature of approximately 250° F., where it can be cured by steam or any other heat. Obviously, other curing means, either natural or artificial, can be used.

In order to demonstrate the advantages of the process, from a standpoint of making a single inner spring body supporting article, which can have portions of lesser and greater firmness, examples are shown in FIGURES 5 and 6, with respect to mattresses. Obviously, such examples are to be considered as only exemplary and not restrictive since the same concept can be utilized in the formation of any type of body supporting article.

With reference to FIGURE 5, the mattress 52 has a bed or bottom layer 54 and an upper or body supporting layer 56 with a spring unit 58, interposed between the layers. The upper layer 56 surrounds the spring unit and cooperates with the bed or bottom layer 54 in forming the borders or edges of the mattress and the spring unit 58 is completely enclosed and encased. The coils of the spring unit are completely filled with the particles forming the upper layer 56 and, as aforestated, each individual convolution of each coil and the connections between the coils have particles completely insulating and covering them.

In the formation of mattress 52, the side 60, while the upper or body supporting layer 56 was being worked in the mold 32, was piled to a greater height than the side 62 and, when the lid 40 or other compression means was applied, the result achieved was that the side 60 had a greater or higher density than the side 62. Therefore, the side 60 will be harder than the companion side 62 and will provide a harder and more firm support.

This is advantageous, since two persons using the same single mattress 52 could have the desired support, one side being relatively harder than the other side.

As shown in FIGURE 6, the same idea can be carried over into the formation of a mattress 64, wherein the center portion 66 is of a greater density than the ends 68 and 70. Such a mattress would be of considerable value for a person, who needed or desired a firm support for his back.

It can be realized, from considering FIGURES 5 and 6 and the foregoing brief descriptions thereof, that by piling the foam particles at any desired place and making the thickness at such point greater or lesser, an article can be formed which will have a desired density at such place. Thus, an important objective, which can be realized by virtue of the material nature of the adhesive coated individual particles, is that an article can be formed, as a unit with an encased spring construction, which article can have portions of varying densities. In carrying out the method, it is only required that the particles be piled up to a greater extent at any desired place. Then when the particles are compressed and set and the article is cured, such place will have a greater density and will be harder.

This is of tremendous value in making a therapeutic mattress wherein certain sections thereof, such as the intermediate portion 66 of the mattress in FIG. 6, can be harder than other sections, though the matress is of unitary construction.

While the mattresses 52 and 64 will be compressed, as by the flat lid 40 or its functional equivalent, it is understood that a compression lid or member, which is undulated or has curved sections can be used. For example, this could result in the production of a mattress having a built-up raised top end, which would serve as a built-in pillow.

Because of the nature of the particles and the adhesive surfaces thereof and the manner in which they are worked into, through and around the coils of the spring unit, the coils become part of the curved foam article and a better all around article is realized. The particles and spring unit become one and act as one.

It is of particular importance to note that the specified adhesive, or other equivalent adhesive, presents a working time of approximately 10 to 20 minutes before the deposited particles tend to adhere to each other. Therefore, in the step, diagrammatically illustrated in FIGURE 4, the second or body supporting layer 50 of the article can be worked so as to pack the particles into, through and around the convolutions of the coils of the spring unit and the layer can be built up at any desired place before the particles tend to adhere to each other.

While specific disclosure has been made of the utilization of scraps of foam materials, such as polyurethane, it is to be understood, as aforementioned, that any pliable cellular or spongy material can be utilized and, in this respect, the cutting step is not necessarily important, since the particles may be made in the desired minute size and then blended in the blender with the adhesive so that each particle has its peripheral surface coated with the adhesive.

Furthermore, other types of material can be employed, which materials would be well known for use as padding of stuffing for cushions and mattresses and which would have the attributes of being pliable, resilient and sponge-like.

It has been described that the bed layer is first formed and has an even upper surface on which the spring unit, which can be of any basic construction, is placed. The superimposed spring unit seats firmly and evenly on the upper surface of the bed layer and then the particles gravitate, similar to falling snow, onto the spring unit and are worked, by hand or by any mechanical means, in the manner specified so that the layer 50 surrounds, encompasses and fills the voids of the coils of the spring unit. However, it is within the scope of the present invention that the particles can be freely deposited in a mold and, then, without compressing them, the spring unit is placed therein and the flow of particles is continued and the entire unit placed under compression, without the separate formation of distinct layers.

While a particular mechanical means has been shown and described for practicing the novel process, such should be considered as merely exemplary and, in this respect, a mold can be filled with the particles and the particles can be compressed into a cohesive adherent mass, with a spring unit encased therein, by other mechanical means.

Of course, the mattresses 52 and 64, as well as other types of body supporting articles, which are formed in the manner shown and described, will be covered with a fabric type covering in the formation of the final, finished commercial product.

Accordingly, while the best known manner of practicing the present invention and exemplary forms and the resultant articles have been shown and described herein, it is to be understood that other methods may be practiced and all types of inner spring articles may be formed, as come within the preview and scope of the appended claims.

We claim:

1. A unitary inner spring body supporting article comprising a resilient multicellular body composed of individual particles of a pliable, resilient, spongy material which are in an adherent compressed relationship and a spring unit encased in said body.

2. The invention of claim 1 wherein the body has vertical sections in which the states of compression of the individual particles are dissimilar.

References Cited

UNITED STATES PATENTS

| | | | |
|---|---|---|---|
| 590,328 | 9/1897 | Muller | 5—361 |
| 2,150,287 | 3/1939 | Minor | 5—355 X |
| 2,486,050 | 10/1949 | Miller et al. | 264—113 |
| 2,512,007 | 6/1950 | Benda | 5—351 |
| 2,678,081 | 5/1954 | Rainard et al. | |
| 2,882,327 | 4/1959 | Roberts. | |
| 2,980,168 | 4/1961 | Ross | 5—351 |
| 2,994,110 | 8/1961 | Hardy | 264—112 |
| 3,099,021 | 7/1963 | Wetzter | 5—355 X |
| 3,210,781 | 10/1965 | Pollock | 5—351 |

CASMIR A. NUNBERG, *Primary Examiner.*